United States Patent
McBurney et al.

(10) Patent No.: US 7,123,190 B1
(45) Date of Patent: Oct. 17, 2006

(54) SKIPPING Z-COUNTS AND ACCURATE TIME IN GPS RECEIVERS

(75) Inventors: Paul W. McBurney, San Francisco, CA (US); France Rode, Los Altos, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 0 days.

(21) Appl. No.: 11/218,460

(22) Filed: Sep. 2, 2005

Related U.S. Application Data

(62) Division of application No. 11/048,457, filed on Jan. 31, 2005, now Pat. No. 7,019,689.

(51) Int. Cl.
*G01S 1/00* (2006.01)

(52) U.S. Cl. .............................. 342/357.15; 342/357.12

(58) Field of Classification Search ........... 342/357.06, 342/357.12, 357.15; 701/207, 213, 215
See application file for complete search history.

(56) References Cited

U.S. PATENT DOCUMENTS

| | | | |
|---|---|---|---|
| 5,893,044 A | 4/1999 | King et al. | |
| 6,400,314 B1 | 6/2002 | Krasner | |
| 6,559,795 B1 | 5/2003 | McBurney et al. | |
| 6,683,564 B1 | 1/2004 | McBurney | |
| 6,714,160 B1* | 3/2004 | McBurney | 342/357.15 |
| 6,919,841 B1 | 7/2005 | Yamazaki | |
| 2003/0139879 A1 | 7/2003 | Krasner | |
| 2003/0143951 A1 | 7/2003 | Challa et al. | |
| 2005/0195105 A1* | 9/2005 | McBurney et al. | 342/357.1 |

FOREIGN PATENT DOCUMENTS

EP    1486795    12/2004

* cited by examiner

*Primary Examiner*—Dao Phan

(57) ABSTRACT

A navigation-satellite receiver comprises high-sensitivity radio frequency front-end and navigation processor associated with a client CPU. The client CPU runs an operating system that serially communicates with the navigation processor. The client CPU is also able to obtain navigation data system transmissions from a network server and provides such when the direct satellite signals in the high-sensitivity environment are too weak to be demodulated directly. A low power, low frequency oscillator with a watch-type crystal and counter are used as a real time clock to keep time uncertainty under fifty milliseconds when the receiver is hibernating. If the time uncertainty and position uncertainty are below certain maximums when the receiver is re-awakened, then a minimum number of satellites will be needed and making a preliminary z-count to each can be avoided.

4 Claims, 2 Drawing Sheets

SKIPPING Z-COUNTS AND ACCURATE TIME IN GPS RECEIVERS

CONTINUING APPLICATION DATA

Figure 1:
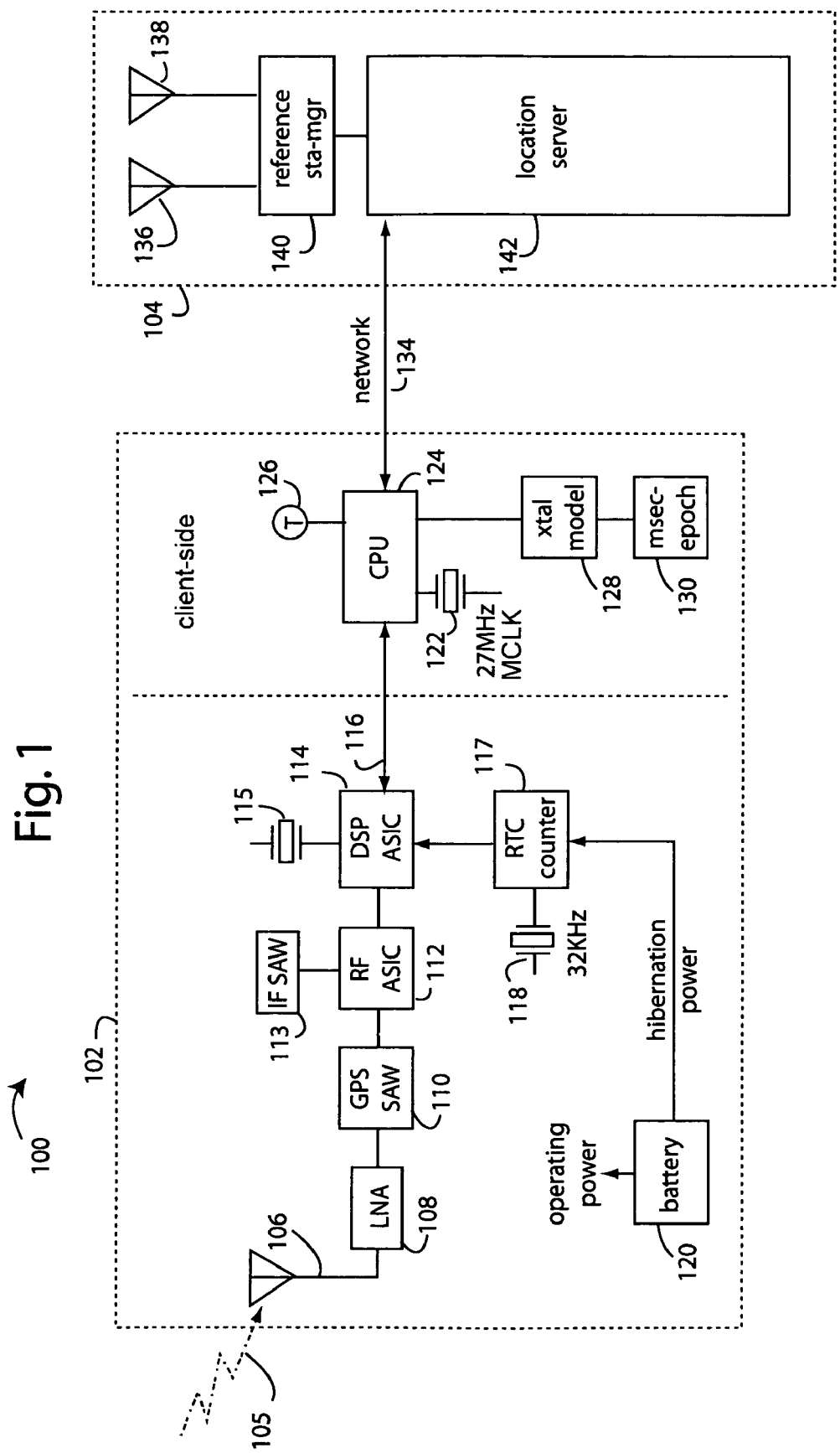

This application is a divisional of U.S. patent application Ser. No. 11/048,457 filed Jan. 31, 2005 now U.S. Pat. No. 7,019,689, the contents of which are incorporated herein by reference.

FIELD OF THE INVENTION

The present invention relates to high-sensitivity navigation satellite receivers that are turned off, and then back on in weak signal environments, and more particularly to methods and circuits for avoiding determining the z-count and system time when the received signal is too weak to demodulate the navigation data from the GPS carrier.

DESCRIPTION OF THE PRIOR ART

Global positioning system (GPS) receivers use signals received from several earth-orbiting satellites in a constellation to determine user position and velocity, and other navigational data. A prior art navigation receiver that has just been turned on does not yet know where it is, how much its crystal oscillator is in error, nor what time it is. All these are needed to find and lock onto the satellite transmissions, and so a search must be made of the possibilities. The most probable are searched first to save time.

High-sensitivity GPS receivers have a problem when the initial time or frequency uncertainty is large. When the signal energy is extremely faint, the receiver must listen to more individual frequencies that are closer together, and dwell at each step longer. The Doppler shift caused by the relative velocity of the satellites in flight contributes to some of this frequency uncertainty, but so does the local clock error. If the local clock has not been synchronized to a precise time reference, the clock error can be very large. When a conventional GPS receiver is turned off, it stops tracking the GPS satellites that were providing precision time references. The reference oscillators in GPS receivers are also typically shut down when the receiver is turned off by the user. So having a better initial estimate of the local reference oscillator can improve time-to-first-fix.

The "z-count" is a time stamp sent in the GPS navigation message every six seconds. Without knowing position, the receiver time can be initially set ±13 msec with the first z-count since the range to any of the orbiting satellites over the surface of the earth is 60–85 milliseconds.

GPS receivers with signal levels better that −145 dbm can readily lock onto a strong GPS satellite vehicle (SV) to decode the NAV-data. Such yields the SV ephemeris and position. After that, the total pseudorange needs to be formed from the hardware codephase. Conventional GPS receivers determine the integer millisecond range from the so-called z-count.

When signal levels are roughly no better than −145 dbm to −150 dbm, a practical high-sensitivity GPS receiver can employ pattern-matching tricks to get a z-count.

GPS receivers that are locked onto and tracking one or more GPS satellite vehicles (SV's), know time to very high accuracy. This is because the GPS system is based on atomic clocks that set the time and frequency references used. The coarse acquisition (C/A) transmitted by the SV's repeats every one millisecond of propagation wavelength, and so there is a basic ambiguity as to which millisecond a GPS receiver is observing. If the integer millisecond is known, e.g., pseudorange is known to better than one millisecond, then the integer ambiguity is solved. Accurate time can then be obtained from the fix. During initial acquisition, a minimum of three, not four, satellites need to be acquired. Finding one less satellite can result in time saved to the first fix.

The present inventor, Paul McBurney, describes a solution that keeps a real time clock running, see U.S. Pat. No. 6,714,160, issued Mar. 30, 2004. Such is incorporated herein by reference. However, with such a solution, the idle current needed just to keep the real time clock alive can be three milliamps at three volts, or 9–10 milliwatts. What is needed is a real time clock that can provide good results at less than ten microwatts. Paul McBurney, further describes a grid search method in U.S. Pat. No. 6,670,916, issued Dec. 30, 2003. A navigation-satellite receiver can get a head start in its initialization by knowing time to within a few seconds and position to within 150 kilometers. A two-dimensional grid of points is setup with constant altitude that represents solution starting points within the 150 kilometer area. Fractional pseudoranges from each satellite in a constellation are inspected for a best initial fit with the points in the grid. A variety of time bias adjustments within the time bounds are also tried against the points to find a best fitting point. That point then is used in a drive to find the final solution and to produce the first fix.

A z-count is needed to determine the integer millisecond to the receiver from the satellites whenever the position uncertainty exceeds one-half the codephase ambiguity distance. The total pseudorange, e.g., the integer millisecond and the z-count, has to be formed in order to compute the user position fix.

What is needed is a low energy way to keep time that is accurate enough to speed up warm-starts of high-sensitivity GPS receivers.

SUMMARY OF THE INVENTION

Briefly, a navigation-satellite receiver embodiment of the present invention comprises high-sensitivity radio frequency front end and navigation processor associated with a client CPU. The client CPU runs an operating system that serially communicates with the navigation processor. The client CPU is also able to obtain navigation data system transmissions from a network server and provides such when the direct satellite signals in the high-sensitivity environment are too weak to be demodulated directly. A low power, low frequency oscillator with a watch-type crystal and counter are used as a real time clock to keep time uncertainty under fifty milliseconds when the receiver is hibernating. If the time uncertainty and position uncertainty are below certain maximums when the receiver is re-awakened, then a minimum number of satellites will be needed and making a preliminary z-count to each can be avoided.

An advantage of the present invention is that a circuit and method are provided that produce faster high-sensitivity fixes in navigation satellite receivers.

Another advantage of the present invention is that a system and method are provided for when the signal is very weak but strong enough to get codephase, and for avoiding the use of more difficult procedures and calculations in GPS receivers to find the z-count and integer millisecond.

A still further advantage of the present invention is that a system and method are provided for reducing the hibernation current needed by real time clocks in GPS receivers.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
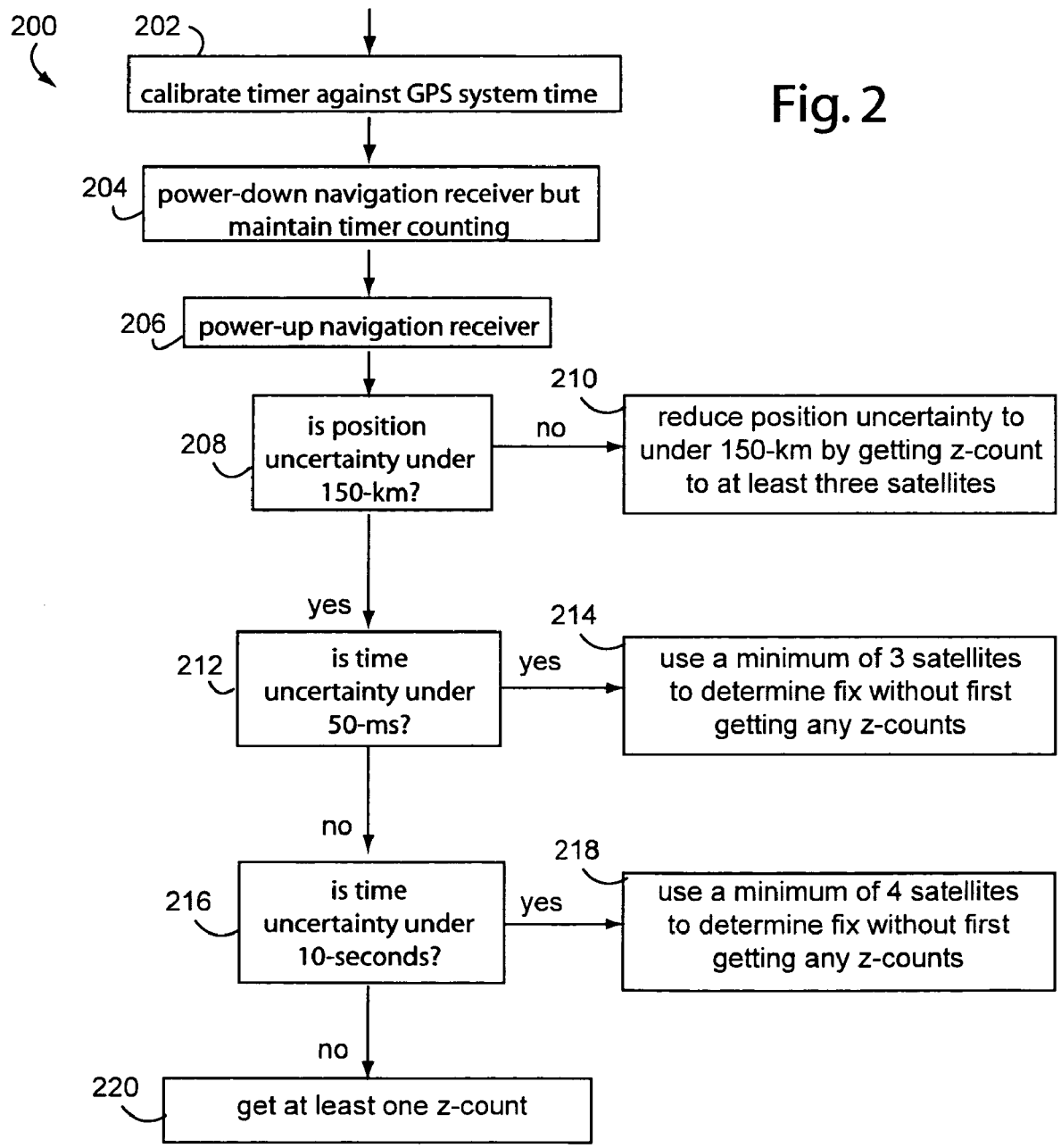

FIG. 1 is a functional block diagram of a network system embodiment of the present invention wherein a server is supporting a client with information communicated over the Internet; and FIG. 2 is a flowchart diagram of a method embodiment of the present invention.

DETAILED DESCRIPTION OF THE PREFERRED EMBODIMENT

FIG. 1 represents a high-sensitivity navigation satellite receiver system embodiment of the present invention, and is referred to herein by the general reference numeral 100. The system 100 includes at least one navigation platform 102 supported by a network server 104. The received transmissions from orbiting navigation satellites are represented by a signal 105. The principle benefits of the present invention are realized when signal 105 is too weak to allow the navigation data to be demodulated, but is strong enough to allow codephase to be obtained. Since the navigation platform 102 needs such navigation data to produce fixes, the network server 104 is called to provide such information.

Embodiments of the present invention are therefore associated with high-sensitivity GPS receivers that operate where signal strengths are very low and a previous position within one-half the codephase ambiguity distance is available. (Which is ordinarily about 75-km, but expands to about 150-km with a grid search because position uncertainty is reduced, so that clock uncertainty can be properly unwrapped.) For example, indoors or under natural cover like tree foliage. In such situations the number of available satellites may also be marginal, and there are advantages to having the minimum number of satellites needed for a warm-start high-sensitivity fix to three satellites and not four.

Each GPS measurement platform 102 typically comprises a GPS antenna 106, a low-noise amplifier (LNA) 108, a GPS surface acoustic wave (SAW) filter 110, a radio frequency (RF) application specific integrated circuit (ASIC) 112 with an intermediate frequency (IF) SAW-filter 113, a specialized GPS navigation digital signal processor (DSP) 114, a high-frequency CPU crystal oscillator 115, a client communication channel 116, a real-time clock (RTC) counter 117, a low-frequency watch-type crystal oscillator 118, and a battery 120.

Operating the crystal oscillator 118 with a watch-type crystal saves a substantial amount of power. Such crystals resonate at about 32-kHz and this low-frequency encounters much fewer AC-loading effects. Prior art RTC's have used oscillators with much higher frequencies and idle currents.

The DSP 114 includes a position and time uncertainty calculator. Such can determine during a restart if the position uncertainty has grown larger than about one-half the codephase ambiguity distance due to user movements, and/ or the time uncertainty has grown larger than about 50-ms, or larger than 10-seconds. If the received signals are too weak to determine z-count, then the codephase noise is higher. The computed satellite position error caused by the time error below 50-ms does not degrade the position accuracy above that of the codephase noise. The modeling in the no-z fix becomes indeterminate beyond 10-seconds. The true time error is the integral of the frequency error during the off period. Such can be approximated by multiplying the worst-case frequency error by the period the receiver was turned-off. Temperature correction methods can be used to extend the allowable off-time.

The DSP 114 further includes logic that will skip the preliminary determination of z-counts if the position and time uncertainty calculator indicates the uncertainties are small enough to proceed directly to a fix. Such logic can use as few as three satellites with no z-counts to obtain a first warm-start fix. Such is detailed further in FIG. 2.

On a "client-side," there is included a 27.456 MHz master clock (MCLK) crystal oscillator 122, a host processor (CPU) 124, a reference-crystal temperature sensor (T) 126, a crystal temperature-frequency model 128, and a millisecond epoch monitor 130 that monitors the msec of MCLK. The communication between the client CPU 124 and the DSP 114 is over serial channel 116. An operating system running on the client CPU 124 controls such and may be busy with jobs other than navigation. Therefore, any time maintained by the client-side cannot be communicated to the DSP 114 well enough to be useful in initializing. If the DSP 114 is going to have usefully accurate time maintained while it is powered-down, it must have a local timer like RTC 117. The DSP 114 can calibrate the count offset of RTC 117 against GPS system time, and subtract this bias later when it accesses the RTC 117 count.

The RTC 117 count is synchronized to read only on the millisecond (msec) interval of the GPS system time. This assures consistent readings that provide the better than 50-msec accuracy needed. If the counter were read only ad hoc, then a 50-msec accuracy would be impossible. After the receiver fixes, it knows GPS time at a specific msec, so it can propagate the time to any msec with almost no error. When the receiver is re-started, another GPS msec is read. By adding the difference between the counter at the last fix and the current value read on a current msec, then it can be known what time to associate with that new msec.

In one embodiment, the low-frequency watch-type crystal oscillator 118 operates at approximately 32.768 KHz, and has a basic crystal frequency tolerance of ±20 ppm. For example, a conventional quartz-watch oscillator crystal.

Crystal oscillators operated in the 32.768 KHz range require far less power to operate than oscillators running at much higher frequencies. This is mainly due to the increasing capacitive loading of AC-signals that occurs at higher frequencies.

The battery 120 provides portable operation, and supplies operating power that can be shut off by a user. A hibernation power cannot be switched off by the user, and such keeps alive the low-frequency oscillator 118 and RTC counter 117.

When a high-sensitivity navigation receiver is re-awakened, there will be two basic uncertainties, e.g., position and time. If the position uncertainty is under one-half the codephase ambiguity distance, and the time uncertainty is under 50-ms, then shortcuts can be used to provide fast warm-start fixes because some hard-to-obtain information can skipped over. A minimum of three satellites is needed for this. If the time uncertainty is less than ten seconds, then the z-counts to each satellite can still be avoided, but a minimum of four satellites will be needed.

Embodiments of the present invention reduce the time uncertainty after powering back up by calibrating the low-frequency oscillator 118 and RTC counter 117 to GPS system time, and using the counts obtained thereafter to reset the receiver clocks during warm starts. Specifically, in very weak signal environments, the navigation data cannot be demodulated from the satellite transmissions directly.

FIG. 2 illustrates a method embodiment of the present invention, and is referred to herein by the general reference numeral 200. After a cold-start and initialization in which accurate GPS system time was available, a step 202 calibrates a timer by reading the counter on a msec-interrupt when the GPS time can be calculated from a GPS fix. For example, RTC counter 117 in FIG. 1 could be used. In a step 204, the navigation receiver is powered down but the timer is kept running, e.g., with a battery as in FIG. 1. When a GPS navigation receiver is re-started, as is a step 206, there will be a position uncertainty and a time uncertainty. The timer is consulted, e.g., by a process in DSP 114, to compute how long the receiver was powered down and therefore what the position and time uncertainties could be. For example, the position uncertainty is the maximum possible user velocity multiplied by delta-time ($\Delta T$). The time uncertainty is the crystal frequency drift multiplied by delta-time ($\Delta T$).

In a step 208, a test is made of the position uncertainties. If such exceeds approximately one-half the codephase ambiguity distance, the propagation distance of half a codephase of one millisecond, then a step 210 is used to get the z-counts to three satellites. This will then reduce the uncertainty to under one-half the codephase ambiguity distance and a grid search method can be used to proceed without necessitating a fourth satellite.

Once the position uncertainty is reduced or determined to be under one-half the codephase ambiguity distance, then a step 212 can be used to check if the time uncertainty is under 50-ms. If it is, in a step 214 a fix can be determined without z-counts and with only three satellites. A step 216 is used to check if the time uncertainty is under ten seconds. If it is, a step 218 determines a fix without z-counts, but it needs four satellites. Otherwise, a step 220 gets at least one z-count.

A method embodiment of the present invention for faster warm-starts of a high-sensitivity navigation satellite receiver in a weak signal environment has two distinct sessions. During a first session with a GPS receiver, GPS satellites are acquired and a user position fix is produced. Then the GPS system time at a receiver millisecond is solved. A count from a crystal-oscillator driven timer included in the GPS receiver is read and calibrated relative to the receiver millisecond. Any count obtained from the timer and the GPS system time it was obtained are logged in a memory. Powering down then ends the first session.

Powering back up begins a second session, but all the while the timer is kept alive and continues to advance its count. The count of the timer is read at a receiver millisecond and a last count stored in the memory in the first session is subtracted to determine how many clocks the GPS receiver was turned-off. The number of clocks to the last known GPS system time is used to set the receiver time. So a time-consuming or non-available request from a server for NAV-data can avoided when the position uncertainty does not exceed a particular threshold.

Such timer clocked at about 32-KHz as described herein, can be operated at less than ten microwatts. Temperature measurements can also be periodically taken to further fine tune the periods being calculated in which the receiver was turned off. For example, parsing the whole off-time into constituent periods.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A method for faster warm-starts of a high-sensitivity navigation satellite receiver in a weak signal environment, the method comprising:
   during a first session with a GPS receiver, acquiring GPS satellites and producing a user position fix and solving GPS system time at a receiver millisecond interval;
   reading and calibrating a count relative to said receiver millisecond interval from a crystal-oscillator driven timer included in said GPS receiver;
   logging in a memory any count obtained from said timer and the GPS system time when the count was obtained;
   powering down to end said first session and powering back up to begin a second session, all the while said timer is kept alive and continues to advance its count;
   reading the count of said timer at a receiver millisecond interval and subtracting a last count stored in said memory in said first session to determine a turn-off period that the GPS receiver was turned-off; and
   adding said turn-off period to a last known GPS system time to set the receiver time.

2. The method of claim 1, further comprising:
   testing a position uncertainty, and
   if said position uncertainty exceeds approximately one-half a codephase ambiguity distance, then obtaining z-counts to three satellites to then reduce the uncertainty to under one-half the codephase ambiguity distance.

3. The method of claim 1, further comprising:
   checking if a time uncertainty is under ten seconds by reading the current timer count and adding the current timer count to a system time obtained in the step of calibrating, and if the time uncertainty is under ten seconds, determining a position fix without z-counts but acquiring at least four satellites.

4. The method of claim 1, further comprising:
   clocking said timer at about 32-KHz and operating it with a power dissipation of less than ten microwatts.

* * * * *